United States Patent
Park

[11] Patent Number: 5,993,347
[45] Date of Patent: Nov. 30, 1999

[54] GEAR TRAIN FOR A 6-SPEED AUTOMATIC TRANSMISSION USED IN VEHICLES

[75] Inventor: Dong Hoon Park, Kyungki-do, Rep. of Korea

[73] Assignee: Hyundai Motor Company, Rep. of Korea

[21] Appl. No.: 08/919,103

[22] Filed: Aug. 28, 1997

[30] Foreign Application Priority Data

Dec. 20, 1996 [KR] Rep. of Korea ....................... 96-68515

[51] Int. Cl.⁶ ....................................................... F16H 3/62
[52] U.S. Cl. ............................ 475/280; 475/290; 475/903
[58] Field of Search ................................... 475/269, 271, 475/282, 290, 296, 330, 903, 280

[56] References Cited

U.S. PATENT DOCUMENTS

| | | | |
|---|---|---|---|
| 2,478,869 | 8/1949 | Hasbany | 475/903 X |
| 3,999,448 | 12/1976 | Murakami et al. | 475/280 X |
| 4,027,551 | 6/1977 | Murakami et al. | 475/280 X |
| 4,224,838 | 9/1980 | Roushdy et al. | 475/903 X |
| 4,229,996 | 10/1980 | Hildebrand | 475/903 X |
| 4,872,376 | 10/1989 | Asada et al. | |
| 5,429,557 | 7/1995 | Beim | 475/283 |

*Primary Examiner*—Charles A. Marmor
*Assistant Examiner*—Sherry Lynn Estremsky
*Attorney, Agent, or Firm*—Finnegan, Henderson, Farabow, Garrett & Dunner, L.L.P.

[57] ABSTRACT

A gear train for 6-speed automatic transmissions used in vehicles includes a compound planetary gear set, realized through combining first and second planetary gear sets in a radial direction, the second simple planetary gear set being enclosed by a ring gear of the first simple planetary gear set, the ring gear able to act as a sun gear for the second simple planetary gear set, and having five operational elements. A clutch assembly is mounted between at least three of the five operational elements of the compound planetary gear set and an input shaft, and operates to select the operational elements to be input elements. A brake assembly is mounted between at least three of the five operational elements of the compound planetary gear set and a transmission housing, and operates to select the operational elements to be reaction elements.

14 Claims, 8 Drawing Sheets

FIG.2

| Range | Friction Element | 8 | 10 | 12 | 14 | 16 | 18 | Remark |
|---|---|---|---|---|---|---|---|---|
| R | | | | O | O | | | |
| N | | | | | | | | |
| D | 1 | O | | | O | | | |
| | 2 | O | | | | O | | |
| | 3 | O | | | | | O | |
| | 4 | O | O | | | | | |
| | 5 | | O | | | | O | |
| | 6 | | O | | | O | | |

FIG.6

| Range | Friction Element | 8 | 10 | 12 | 14 | 16 | 18 | 46 | Remark |
|---|---|---|---|---|---|---|---|---|---|
| R | | ○ | | | | | | ○ | |
| N | | ○ | | | | | | | |
| D | 1 | ○ | | | | | | | |
| D | 2 | | ○ | | ○ | | | | |
| D | 3 | | | ○ | ○ | | | | |
| D | 4 | ○ | | ○ | ○ | | | | |
| D | 5 | | | ○ | | ○ | | | |
| D | 6 | | | ○ | | | ○ | | |

| Range | Friction Element | 60 | 62 | 64 | 78 | 80 | 82 | Remark |
|---|---|---|---|---|---|---|---|---|
| R | | | | o | o | | | |
| N | | | | | | | | |
| D | 1 | o | | | | | | |
| | 2 | o | | | | | | |
| | 3 | o | | | | o | | |
| | 4 | o | o | | | | | |
| | 5 | | o | | | | o | |
| | 6 | | o | | | o | | |

GEAR TRAIN FOR A 6-SPEED AUTOMATIC TRANSMISSION USED IN VEHICLES

BACKGROUND OF THE INVENTION

1. Field of the Invention

The present invention relates to a gear train for a 6-speed automatic transmission used in vehicles. More particularly, the invention relates to a gear train for a 6-speed automatic transmission utilizing a compound planetary gear set consisting of planetary gear sets combined radially, the automatic transmission thereby having a short length and a simple construction.

2. Description of the Related Art

Generally, automatic transmission systems for vehicles are provided with a transmission control unit which automatically controls shift ratios according to changes in a running condition of the vehicle.

The typical transmission control unit controls a plurality of friction elements provided in a gear train to either operative or inoperative states to select one of the three essential elements of the planetary gear set (a sun gear, a ring gear and a planetary carrier) to be an input element, one to be a reaction element, and one to be an output element, thereby controlling an output number of revolutions.

There are different kinds of compound planetary gear systems used in automatic transmission systems including a Ravigneaux-type, a Simpson type, and a 2 Simpson-type compound planetary gear system.

Also, the above compound planetary gear systems, so as to allow for use as a shifting means for vehicles, have a structure in which planetary carriers of a first simple planetary gear set are connected to a planetary carrier of a second simple planetary gear set, a structure where the planetary and ring gear are connected through the sun gear, or a structure in which the planetary carriers of the first simple planetary gear set and a ring gear of the second planetary gear set are directly connected to each other, namely, a structure wherein two planetary gear sets are connected in a direction of an axle.

However, in the typical automatic transmission, as a length of the system in the direction of the axle is increased, mounting becomes difficult, especially when applying the automatic transmission of a front-wheel-drive vehicle in which the engine is mounted in a transverse direction, and, as a result, much time and effort must go into shortening the automatic transmission in the designing process.

Further, when the output power of a large output power engine is not sufficiently utilized, the typical automatic transmission has a poor fuel consumption ratio, power efficiency, and driving performance.

Therefore, to efficiently use the engine power, increasing the shift ratio has been proposed.

However, in the typical automatic transmission, as only one input element should be selected, at least two planetary gear sets must be provided, thereby increasing costs for manufacturing and complicating the construction.

SUMMARY OF THE INVENTION

The present invention has been made in an effort to solve the above problems. It is an object of the present invention to provide a gear train for a 6-speed automatic transmission used in vehicles which, by utilizing a compound planetary gear set consisting of planetary gear sets combined radially, the automatic transmission has a short length and a simple construction, and by increasing shift ranges, output of the engine can be more efficiently used than in the prior art.

To achieve the above object, the present invention provides a gear train for a 6-speed automatic transmission used in a vehicle.

A compound planetary gear set is realized through combining first and second planetary gear sets in a radial direction, the second simple planetary gear set being bordered by a ring gear of the first simple planetary gear set, the ring gear able to act as a sun gear for the second simple planetary gear set, and having five operational elements.

A clutch assembly, mounted between at least three of the five operational elements of the compound planetary gear set and an input shaft, operates such that it selects the operational elements to be input elements.

A brake assembly, mounted between at least three of the five operational elements of the compound planetary gear set and a transmission housing, operates such that it selects the operational elements to be reaction elements.

According to another feature of the present invention, the clutch assembly includes: a first clutch interposed between a sun gear of the first simple planetary gear set and the input shaft; a second clutch interposed between the ring of the first simple planetary gear set and the input shaft; and a third clutch interposed between a planetary carrier of the second simple planetary gear set and the input shaft.

According to still another feature of the present invention, the clutch assembly includes: a first clutch interposed between the ring gear of the second simple planetary gear set and the input shaft; a second clutch interposed between the ring gear of the first simple planetary gear set and the input shaft; and a third clutch interposed between a planetary carrier of the first simple planetary gear set and the input shaft.

According to still yet another feature of the present invention, the clutch assembly for transmitting engine power to the compound planetary gear set includes: a first clutch interposed between the sun gear of the first simple planetary gear set and the input shaft; a second clutch interposed between the planetary carrier of the first simple planetary gear set and the input shaft; and a third clutch interposed between the ring gear of the first simple planetary gear set and the input shaft.

According to still yet another feature of the present invention, the clutch assembly includes: a first clutch interposed between the ring gear of the second simple planetary gear set and the input shaft; a second clutch interposed between the planetary carrier of the second simple planetary gear set and the input shaft; and a third clutch interposed between the ring gear of the first simple planetary gear set and the input shaft.

According to still yet another feature of the present invention, the brake assembly includes: a first brake interposed between the ring gear of the first simple planetary gear set and a transmission housing; a second brake interposed between the planetary carrier of the second simple planetary gear set and the transmission housing; and a third brake interposed between the ring gear of the second simple planetary gear set and the transmission housing.

According to still yet another feature of the present invention, the brake assembly includes: a first brake interposed between the ring gear of the first simple planetary gear set and the transmission housing; a second brake interposed between the planetary carrier of the first simple planetary gear set and the transmission housing; and a third brake interposed between the sun gear of the first simple planetary gear set and the transmission housing.

According to still yet another feature of the present invention, the brake assembly includes: a first brake interposed between the ring gear of the second simple planetary gear set and the transmission housing; a second brake interposed between the sun gear of the first simple planetary gear set and the transmission housing; a third brake interposed between the planetary carrier of the first simple planetary gear set and the transmission housing; and a fourth brake interposed between the ring gear of the first simple planetary gear set and the transmission housing.

According to still yet another feature of the present invention, the brake assembly includes: a first brake interposed between the sun gear of the first simple planetary gear set and the transmission housing; a second brake interposed between the ring gear of the second simple planetary gear set and the transmission housing; a third brake interposed between the planetary carrier of the second simple planetary gear set and the transmission housing; and a fourth brake interposed between the ring gear of the first simple planetary gear set and the transmission housing.

According to still yet another feature of the present invention, multi-plate clutches are used for the clutches forming the clutch assembly, and band brakes are used for the brakes forming the brake assembly.

According to still yet another feature of the present invention, the clutch assembly is comprised of a plurality of clutches which are disposed between the sun gear and the ring gear of the first simple planetary gear set, and the planetary carrier of the second simple planetary gear set, and the input shaft, respectively, such that they can selectively act as input elements; and the brake assembly is comprised of a plurality of brakes which are disposed between the ring gear of the first simple planetary gear set, the planetary carrier and the ring gear of the second simple planetary gear set, and the transmission housing, respectively, such that they can selectively act as reaction elements.

According to still yet another feature of the present invention, the clutch assembly is comprised of a plurality of clutches which are disposed between the planetary carrier and the ring gear of the first simple planetary gear set, and the ring gear of the second simple planetary gear set, and the input shaft, respectively, such that they can selectively act as input elements; and the brake assembly is comprised of a plurality of brakes which are disposed between the ring gear, the planetary carrier and the sun gear of the first simple planetary gear set, and the transmission housing, respectively, such that they can selectively act as reaction elements.

According to still yet another feature of the present invention, the clutch assembly is comprised of a plurality of clutches which are disposed between the sun gear, the planetary carrier and the ring gear of the first simple planetary gear set, and the input shaft, respectively, such that they can selectively act as input elements; and the brake assembly is comprised of a plurality of brakes which are disposed between the sun gear, the planetary carrier and the ring gear of the first simple planetary gear set, and the transmission housing, respectively, such that they can selectively act as reaction elements.

According to still yet another feature of the present invention, the clutch assembly is comprised of a plurality of clutches which are disposed between the ring gear of the first simple planetary gear set, and the planetary carrier and the ring gear of the second simple planetary gear set, and the input shaft, respectively, such that they can selectively act as input elements; and the brake assembly is comprised of a plurality of brakes which are disposed between the sun gear and the ring gear of the first simple planetary gear set, and the ring gear and the planetary carrier of the second simple planetary gear set, and the transmission housing, respectively, such that they can selectively act as reaction elements.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 2 is an operational chart of friction elements in each shift range according to a first embodiment of the present invention;

FIG. 6 is an operational chart of friction elements in each shift range according to a third embodiment of the present invention.

FIG. 8 is an operational chart of friction elements in each shift range according to the second embodiment of the invention.

DESCRIPTION OF THE PREFERRED EMBODIMENTS

Preferred embodiments of the present invention will now be described in detail with reference to the accompanying drawings.

Figure 1:
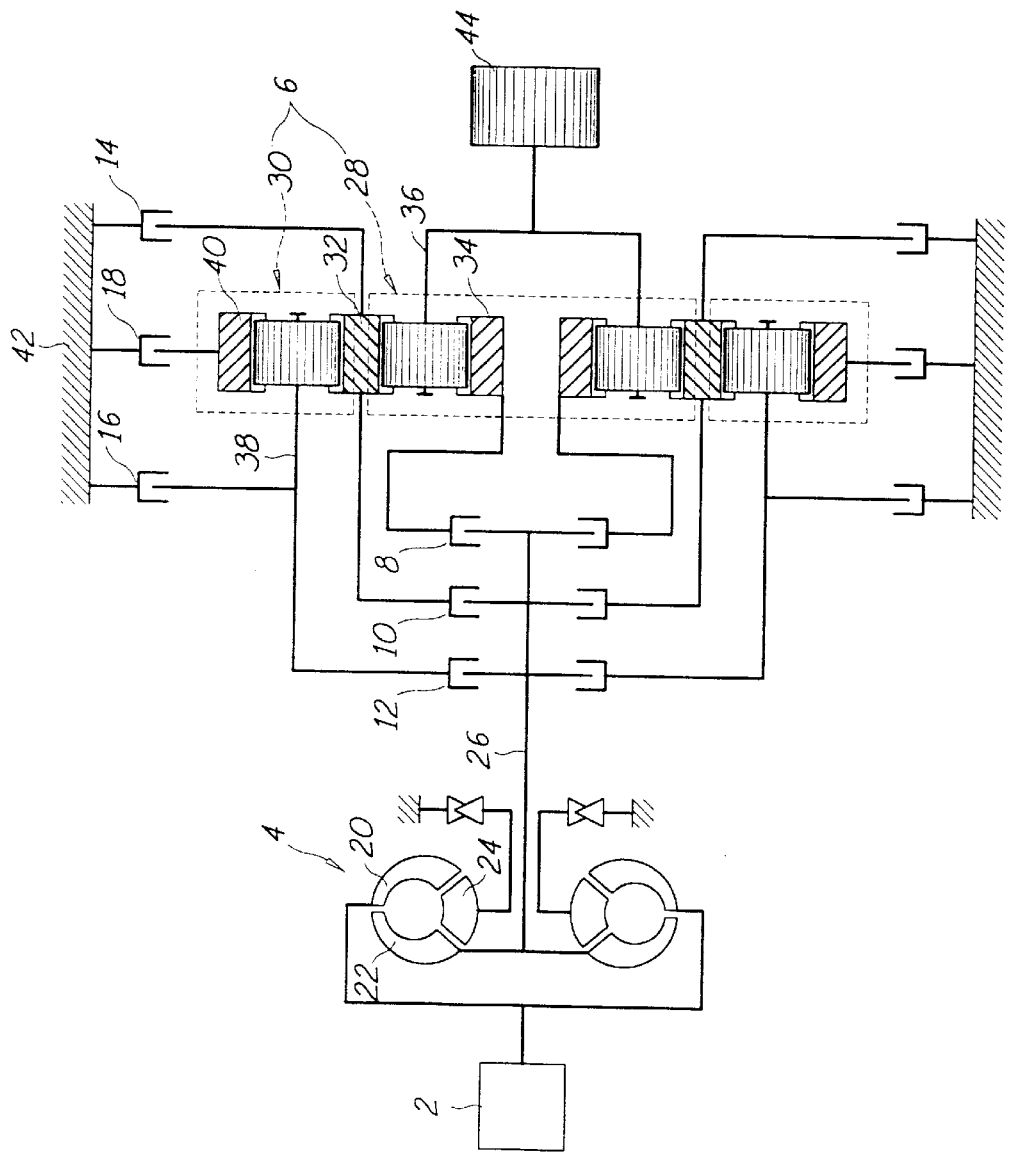
FIG. 1 is a schematic diagram of a gear train according to a first embodiment of the present invention.

Referring to FIG. 1, power generated from an engine 2 passes through a torque converter 4 to realize torque conversion, and is then inputted to a compound planetary gear set 6, thereby accomplishing shifting.

In the above, by a selective operation of a clutch assembly including a plurality of clutches 8, 10 and 12, the compound planetary gear set 6 receives an input through at least one element thereof, and by a selective operation of a brake assembly including a plurality of brakes 14, 16 and 18, at least one element thereof acts as a reaction element in all drive ranges excluding a forward fourth speed range.

The torque converter 4 for converting the torque generated from the engine 2 includes a pump impeller 20 directly connected to a crankshaft of the engine 2 and rotating, a turbine runner 22 mounted opposing the pump impeller 20, thereby rotating together therewith through gushing oil, and a stator 24 disposed between the pump impeller 20 and the turbine runner 22 and changing a flow of oil, thereby increasing a rotary power of the pump impeller 20.

Accordingly, when the engine rotates, the oil charged in the torque converter 4 gushes through the pump impeller 20 and is supplied to the turbine runner 22, thereby driving the turbine runner 22, and then flows into the stator 24.

Further, the oil flowed into the stator 24 is redirected repeatedly to the pump impeller 20. Here, a difference appears in the rotary power of the turbine runner 22 given to the stator 24 by a rotation of the stator 24 and that of the pump impeller 20 thereby accomplishing torque conversion.

Also, the compound planetary gear set 6 receiving power from the torque converter 4 is aligned on a rear side of an input shaft 26 connected to the turbine runner 22 of the torque converter 4.

The compound planetary gear set 6 is constituted by combining first and second simple planetary gear sets 28 and 30 in a radial direction. The second simple planetary gear set 30 is bordered by a ring gear 32 of the first simple planetary gear set 28, and this ring gear 32 is able to act as a sun gear for the second simple planetary gear set 30.

Therefore, the compound planetary gear set 6 possesses the following five operating elements a first sun gear, a first planetary carrier, a first ring gear that also acts as a second sun gear to the second simple planetary gear set, a second planetary carrier and a second ring gear.

Operating as a clutch assembly for transmitting engine power, the first clutch 8 is interposed between the input shaft 26 and the first sun gear 34, the second clutch 10 is interposed between the input shaft 26 and the first ring gear 32, and the third clutch 12 is interposed between the input shaft 26 and the second planetary carrier 38.

As a result of the above, through the selective operation of the clutches 8, 10 and 12, elements connected to these clutches are selectively, or two of them are simultaneously, made to operate as input elements.

Also, forming the brake assembly, the first brake 14 is interposed between the first ring gear 32 and a transmission housing 42, the second brake 16 is interposed between the second planetary carrier 38 and the transmission housing 42, and the third brake 18 is interposed between the second ring gear 40 and the transmission housing 42 to allow the above elements to selectively operate as reaction elements. An output gear 44 is disposed at an end portion of the first planetary carrier 36 to allow it to operate as an output element.

Multi-plate clutches can be used for the first, second and third clutches 8, 10 and 12 forming the clutch assembly, and band brakes can be used for the first, second and third brakes 14, 16 and 18 forming the brake assembly.

As shown in the friction element operational chart of FIG. 2, in the gear train of the present invention structured as above, friction elements are operated to realize shifting. The shift process will be explained hereinafter using the operation chart of FIG. 2 and the lever analogy diagram of FIG. 3.

Figure 3:
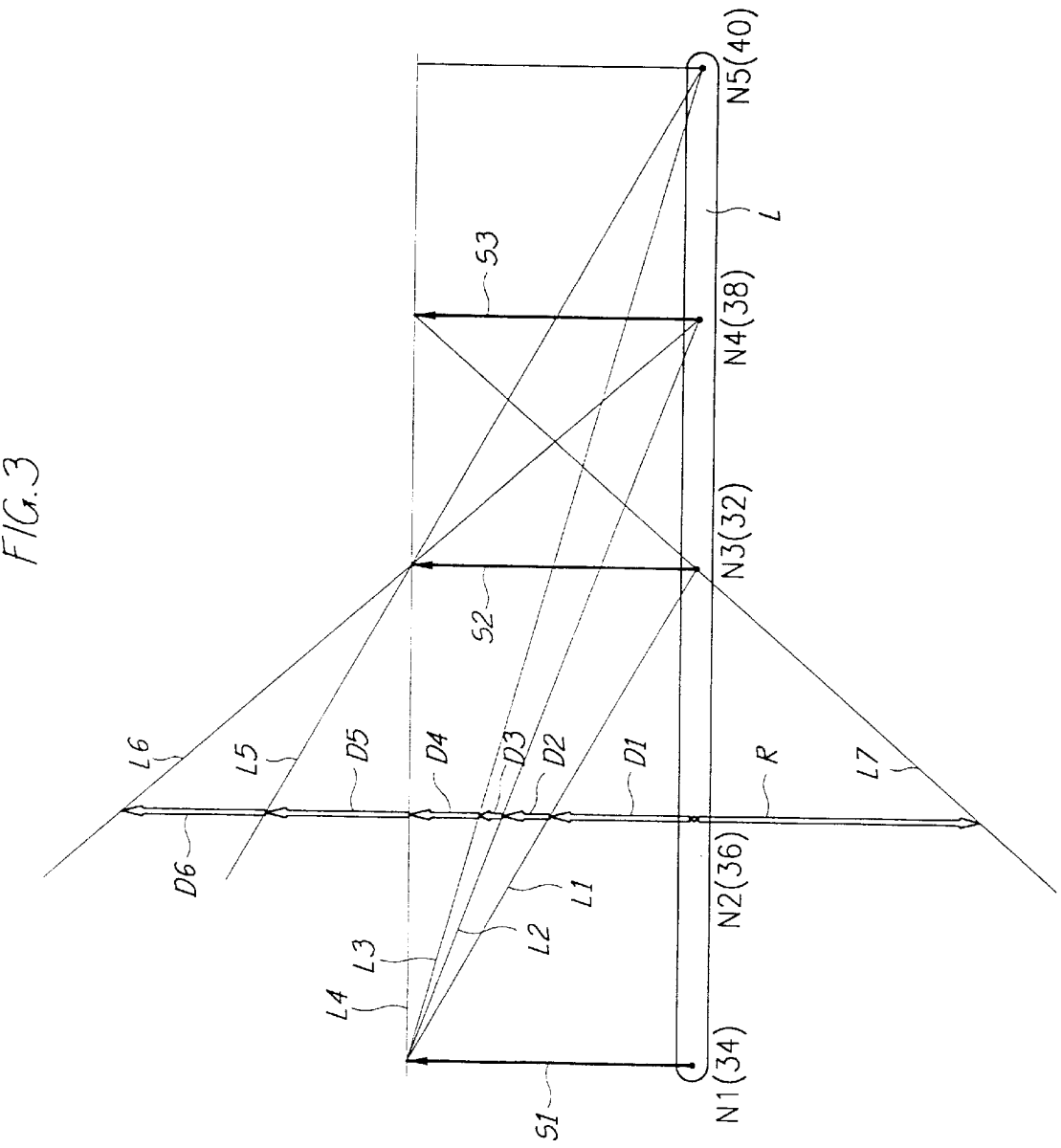
FIG. 3 is a view for explaining an operation of the first embodiment of the present invention through a lever analogy method.

In the lever analogy shown in FIG. 3, a first node N1 indicates the first sun gear 34, a second node N2 indicates the first planetary carrier 36, a third node N3 indicates the first ring gear 32, a fourth node N4 indicates the second planetary carrier 38, and a fifth node N5 indicates the second ring gear 40.

In the operational process of a forward first speed, the first clutch 8 and the first brake 14 are controlled to operate. When this happens, the power of the input shaft 26 which is rotated through the driving force received from the engine 2 makes the first sun gear 34 operate as an input element through the operation of the first clutch 8, and, at the same time, the first ring gear 32 acts as a reaction element through the operation of the first brake 14. Through the above operation, first speed shifting is realized, and through the first planetary carrier 36, output is realized.

Referring to FIG. 3, with regard to the shift process of a first speed, a line connecting the second node N2 to a point on a line L1 connecting a first input speed line S1, inputted at the first node N1, to the third node N3, acting as the reaction element, becomes a first speed output line D1.

Therefore, an output number of rotations becomes much smaller than an input number of rotations, and a reduction in speed is realized through a first speed shift ratio.

In the above first speed state, if vehicle speed and throttle opening are increased, a transmission control unit disengages the first brake 14 and operates the second brake 16. As a result, starting from the input state as in the first speed, by the operation of the second brake 16, the second planetary carrier 38 operates as a reaction element, and second speed shifting is realized.

Referring to FIG. 3, with regard to the shift process of a second speed, a line connecting the second node N2 to a point on a line L2 connecting a first input speed line S1, inputted at the first node N1, to the fourth node N4, acting as the reaction element, becomes a second speed output line D2, realizing output having a higher speed than the first speed.

In the above second speed state, if vehicle speed and throttle opening are increased, the transmission control unit disengages the second brake 16 and operates the third brake 18.

As a result, starting from the input state of the second speed, by the operation of the third brake 18, the second ring gear 40 operates as a reaction element, and third speed shifting is realized.

Referring to FIG. 3, with regard to the shift process of a third speed, a line connecting the second node N2 to a point on a line L3 connecting a first input speed line S1, inputted at the first node N1, to the fifth node N5, acting as the reaction element, becomes a third speed output line D3, realizing output having a higher speed than the second speed.

In the above third speed state, if vehicle speed and throttle opening are increased, the transmission control unit disengages the third brake 18 and operates the second clutch 10.

As a result, starting from the input state of the third speed, by the operation of the second clutch 10, the first ring gear 32 operates as an input element. Accordingly, second input is realized, and as there comes to be two input elements, fourth speed shifting is realized.

Referring to FIG. 3, with regard to the shift process of a fourth speed, a line connecting the second node N2 acting as an output element to a point on a line L4 connecting a first input speed line S1, inputted at the first node N1, to the second speed line S2 of the third node N3, acting as an input element, becomes a fourth speed output line D4.

In the above fourth speed state, if vehicle speed and throttle opening are increased, the transmission control unit disengages the first clutch 8, operating in the fourth speed, and operates the third brake 18.

As a result, starting from the input state through the first ring gear 32, by the operation of the third brake 18, as the second ring gear 40 operates as a reaction element, fifth speed shifting is realized.

Referring to FIG. 3, with regard to the shift process of a fifth speed, a line connecting the second node N2, acting as an output element, to a point on a line L5 connecting a second input speed line S2 of the third node N3 to the fifth node N5, acting as a reaction element, becomes a fifth speed output line D5.

Namely, in the above fifth speed, an overdrive state occurs wherein output speed is faster than input speed.

In the above fifth speed state, if vehicle speed and throttle opening are increased, the transmission control unit disengages the third brake 18, operating in the fifth speed, and operates the second brake 16.

As a result, starting from the input state through the first ring gear 32, by the operation of the second brake 16, as the second planetary carrier 38 operates as a reaction element, sixth speed shifting is realized.

Referring to FIG. 3, with regard to the shift process of a sixth speed, a line connecting the second node N2, acting as an output element, to a point on a line L6 connecting the second input speed line S2 of the third node N3 to the fourth node N4, acting as a reaction element, becomes a sixth speed output line D6.

Also, in the above sixth speed, an overdrive state occurs wherein output speed is faster than input speed.

If a driver changes a selector lever to a reverse R range, the third clutch 12 and the first brake 14 are controlled to be engaged.

When the above happens, input is realized through the second planetary carrier 38 through the operation of the third clutch 12, and, through the operation of the first brake 14, the first ring gear 32 comes to operate as a reaction element to realize reverse R shifting. Also, output is realized through the first planetary carrier 36.

Referring to FIG. 3, a line connecting the second node N2 to a point on a line L7 connected to the third node N3, acting as reaction element, becomes a reverse speed output line R.

Figure 4:
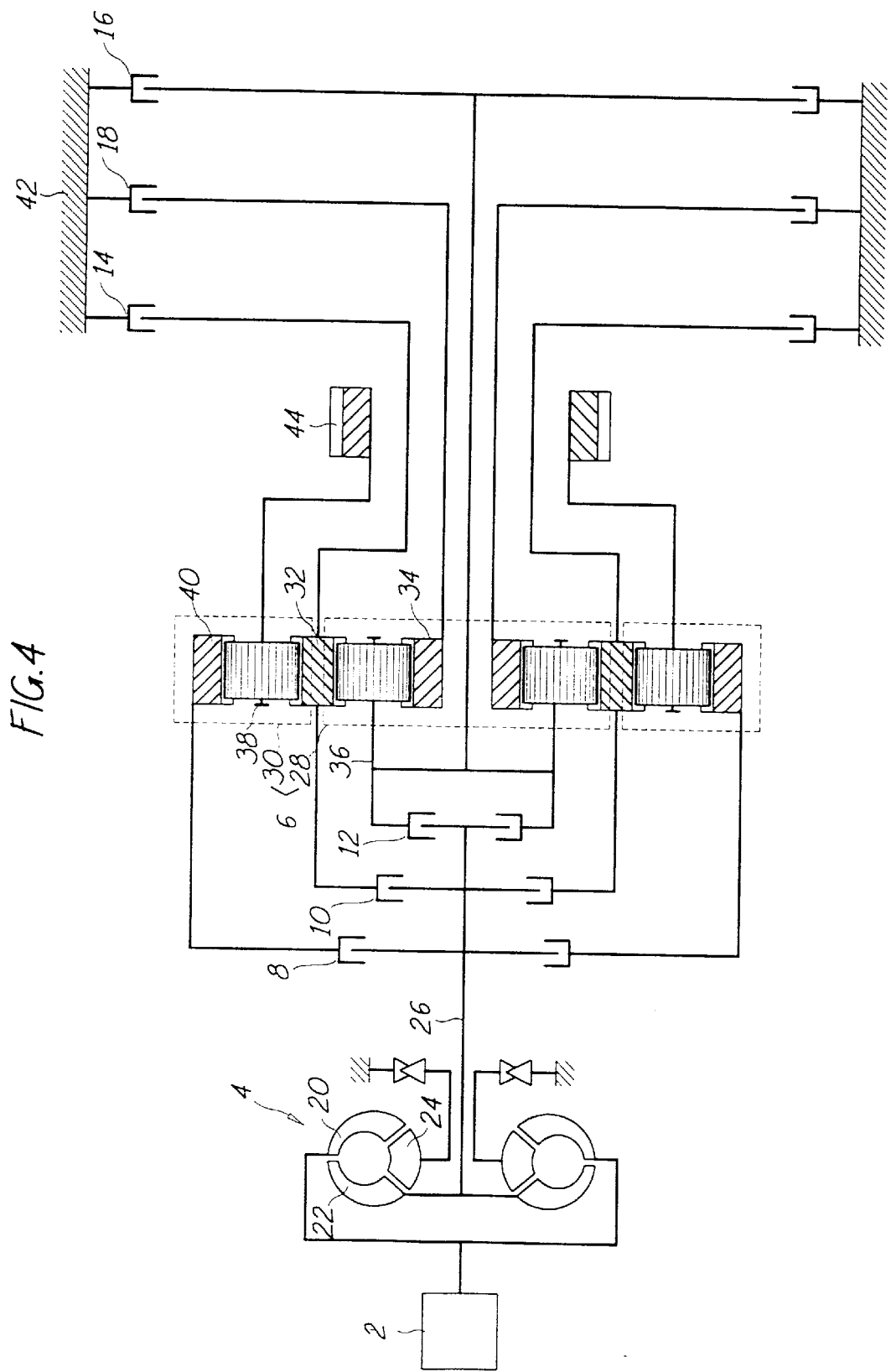
FIG. 4 is a schematic diagram of a gear train according to a second embodiment of the present invention.

Referring now to FIG. 4, there is shown a schematic diagram of a gear train according to a second embodiment of the present invention. In the second embodiment, clutches forming the clutch assembly for transmitting the power of the engine 2 to the compound planetary gear set 6 is differently connected to brakes forming the brake assembly than in the first embodiment.

Namely, a first clutch 60 is interposed between the input shaft 26 and the second ring gear 40, a second clutch 62 is interposed between the input shaft 26 and the first ring gear 32, and the third clutch 64 is interposed between the input shaft 26 and the first planetary carrier 36.

As a result, through the selective operation of the clutches 60, 62 and 64, one or two of the elements connected to them are made to operate as input elements.

In addition, forming the brake assembly, the first brake 78 is interposed between the first ring gear 32 and the transmission housing 42, the second brake 80 is interposed between the first planetary carrier 36 and the transmission housing 42, and the third brake 82 is interposed between the first sun gear 34 and the transmission housing 42 to allow the above elements to selectively operate as reaction elements, and the output gear 44 is disposed at an end portion of the second planetary carrier 38 to allow it to operate as an output element.

In the gear train of the second embodiment structured as above, the clutches and the brakes are operated, as shown in the operational chart of FIG. 8, to realize shifting. In the forward first speed, the first clutch 60 and the first brake 78 are controlled to operate.

When this happens, the power of the input shaft 26 which rotates by the engine 2 makes the second ring gear 40 operate as an input element, and, at the same time, the first ring gear 32 to act as a reaction element by the operation of the first brake 78. Through the above operations, first speed shifting is realized, and through the second planetary carrier 38, output is realized.

If vehicle speed and throttle opening are increased in the above first speed state, the transmission control unit disengages the first brake 78 and operates the second brake 80.

As in the first speed input state, reaction elements are realized by the operation of the second brake 80 through the first planetary carrier 36, and second speed shifting is realized.

If vehicle speed and throttle opening are increased in the above second speed state, the transmission control unit disengages the second brake 80 and operates the third brake 82.

As in the second speed input state, reaction elements are realized by the operation of the third brake 82 through the first sun gear 34, and the third speed shifting is realized.

If vehicle speed and throttle opening are increased in the above third speed state, the transmission control unit disengages the third brake 82 and operates the second clutch 62.

When the above operations are performed, input elements are realized by the operation of the second clutch 62 in the third speed input state through the first ring gear 32 whereby second input is realized, and as there comes to be two input elements, fourth speed shifting is realized.

If vehicle speed and throttle opening are increased in the above fourth speed state, the transmission control unit disengages the first clutch 60, operating in the fourth speed, and controls the third brake 82 to operate.

When the above operations are performed, reaction elements are realized by the operation of the third brake 82, in the input state through the first ring gear 32, and through the first sun gear 34, thereby realizing fifth speed shifting. In the fifth speed, an overdrive state is realized in which output speed is faster that input speed.

If vehicle speed and throttle opening are increased in the above fifth speed state, the transmission control unit disengages the third brake 82, operating in the fifth speed, and controls the second brake 80 to operate.

When the above is performed, by the operation of the second brake 80 in the input state through the first ring gear 32, the first planetary carrier 36 operates as a reaction element thereby realizing sixth speed shifting.

An overdrive state occurs in the above sixth speed as in the fifth speed.

Also, if the driver changes the selector lever to a reverse R range, the transmission control unit controls the third clutch 64 and the first brake 78 to operate.

When the above is performed, input is realized through the first planetary carrier 36 by the operation of the third clutch 64, and, at the same time, by the operation of the first brake 78, the first ring gear 32 operates as a reaction element to realize reverse shifting, and output is realized through the second planetary carrier 38.

Figure 5:
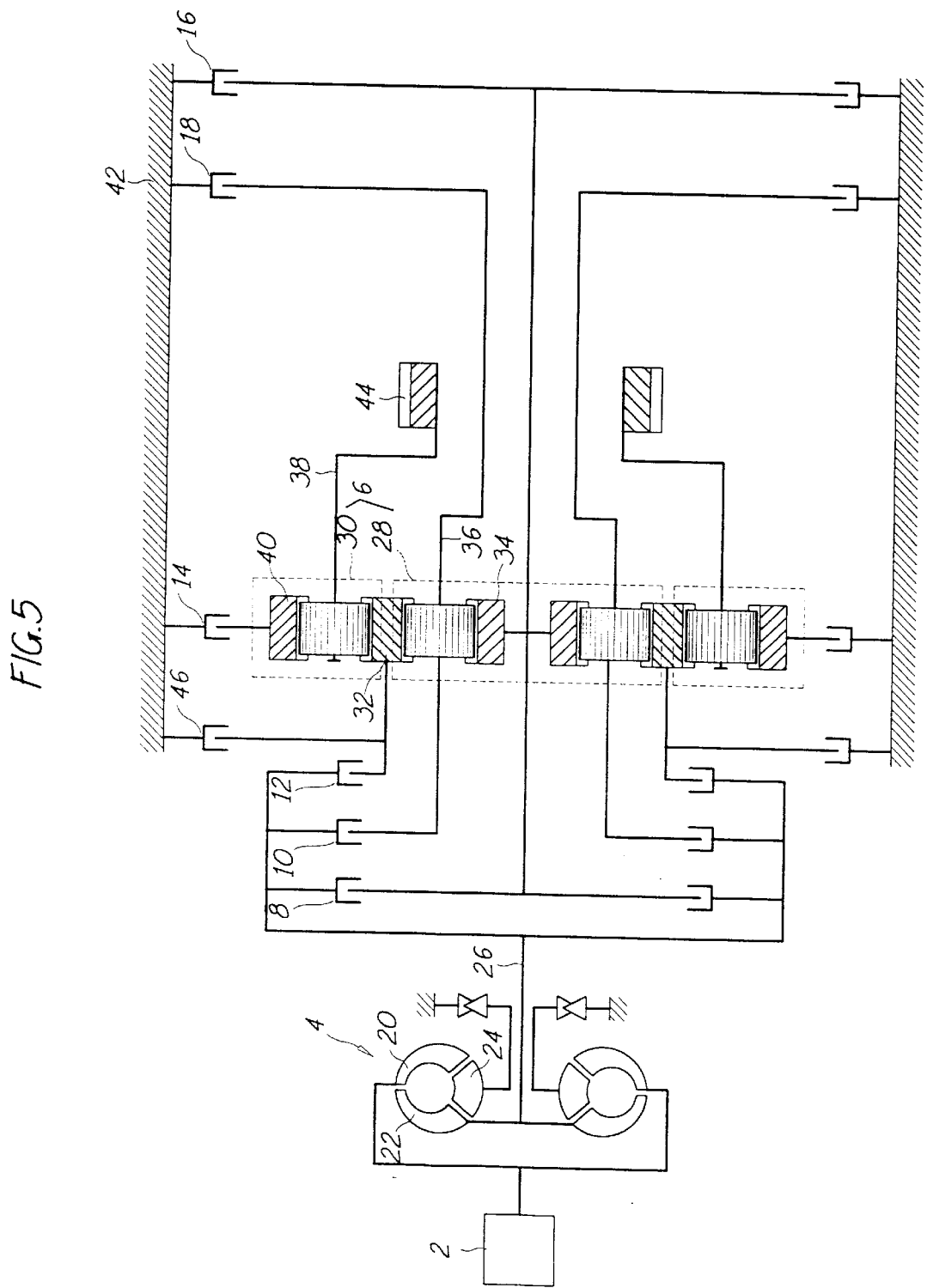
FIG. 5 is a schematic diagram of a gear train according to a third embodiment of the present invention.

Referring to FIG. 5, there is shown a schematic diagram of a gear train according to a third embodiment of the present invention. In the third embodiment, clutches forming the clutch assembly for transmitting the power of the engine 2 to the compound planetary gear set 6 is differently connected to brakes forming the brake assembly than in the first embodiment, and, at the same time, one brake is additionally disposed therein.

Namely, the first clutch 66, forming the clutch assembly for transmitting the power of the engine 2 to the compound planetary gear set 6, is interposed between the input shaft 26 and the first sun gear 34, the second clutch 68 is interposed between the input shaft 26 and the first planetary carrier 36, and the third clutch 70 is interposed between the input shaft 26 and the first ring gear 32.

As a result, through the selective operation of the clutches 66, 68 and 70, one or two of the elements connected to the clutches are made to operate as input elements.

In addition, forming the brake assembly, the first brake 84 is interposed between the second ring gear 40 and the transmission housing 42, the second brake 86 is interposed between the first sun gear 34, the third brake 88 is interposed between the first planetary carrier 36, and the fourth brake 46 is interposed between the first ring gear 32 to allow the above elements to selectively operate as reaction elements, and the output gear 44 is disposed at an end portion of the second planetary carrier 38 to allow it to operate as an output element.

In the gear train of the third embodiment structured as above, the friction elements are operated, as shown in the operational chart of FIG. 6, to realize shifting. In the forward first speed, the first clutch 66 and the first brake 84 are controlled to be operated.

When this is done, the power of the input shaft 26 which rotates by the engine 2 makes the first sun gear 34 operate as an input element by the operation of the first clutch 66, and, at the same time, the second ring gear 40 to act as a reaction element by the operation of the first brake 84. Through the above operations, first speed shifting is realized, and through the second planetary carrier 38, output is realized.

If vehicle speed and throttle opening are increased in the above first speed state, the transmission control unit disengages the first clutch 66 and operates the second clutch 68. When this is done, an input element is changed to the first planetary carrier 36 according to the operation of the second clutch 68, and second speed shifting is realized.

If vehicle speed and throttle opening are increased in the above second speed state, the transmission control unit disengages the second clutch 68 and operates the third clutch 70. When this is done, an input element is changed to the first ring gear 32 according to the operation of the third clutch 70, and a third speed shifting is realized.

In the above third speed state, if vehicle speed and throttle opening are further increased, the transmission control unit disengages the first brake 84 and operates the first clutch 66.

When the above is done, reaction force is released in the third speed input state, and the first sun gear 34 operates as an input element, whereby second input is realized, and as there comes to be two input elements, fourth speed shifting is realized.

If vehicle speed and throttle opening are further increased in the above fourth speed state, the transmission control unit disengages the first clutch 66, operating in the fourth speed, and controls the second brake 86 to operate.

When the above is performed, input is realized through the first ring gear 32, and by the operation of the second brake 86, the first sun gear 34 operates as a reaction element to realize fifth speed shifting.

Also, in the above fifth speed, an overdrive state occurs wherein output speed is faster than input speed.

If vehicle speed and throttle opening are further increased in the above fifth speed state, the transmission control unit disengages the second brake 86, operating in the fifth speed, and controls the third brake 88 to operate.

When the above is performed, by the operation of the third brake 88 in the input state through the first ring gear 32, the first planetary carrier 36 operates as a reaction element thereby realizing sixth speed shifting. An overdrive state occurs in the above sixth speed as in the fifth speed.

Also, if the driver changes the selector lever to a reverse R range, the transmission control unit controls the first clutch 66 and the fourth brake 46 to operate.

When the above is performed, input is realized through the first sun gear 34 by the operation of the first clutch 66, and, at the same time, by the operation of the fourth brake 46, the first ring gear 32 operates as a reaction element to realize reverse shifting, and output is realized through the first planetary carrier 38.

Figure 7:
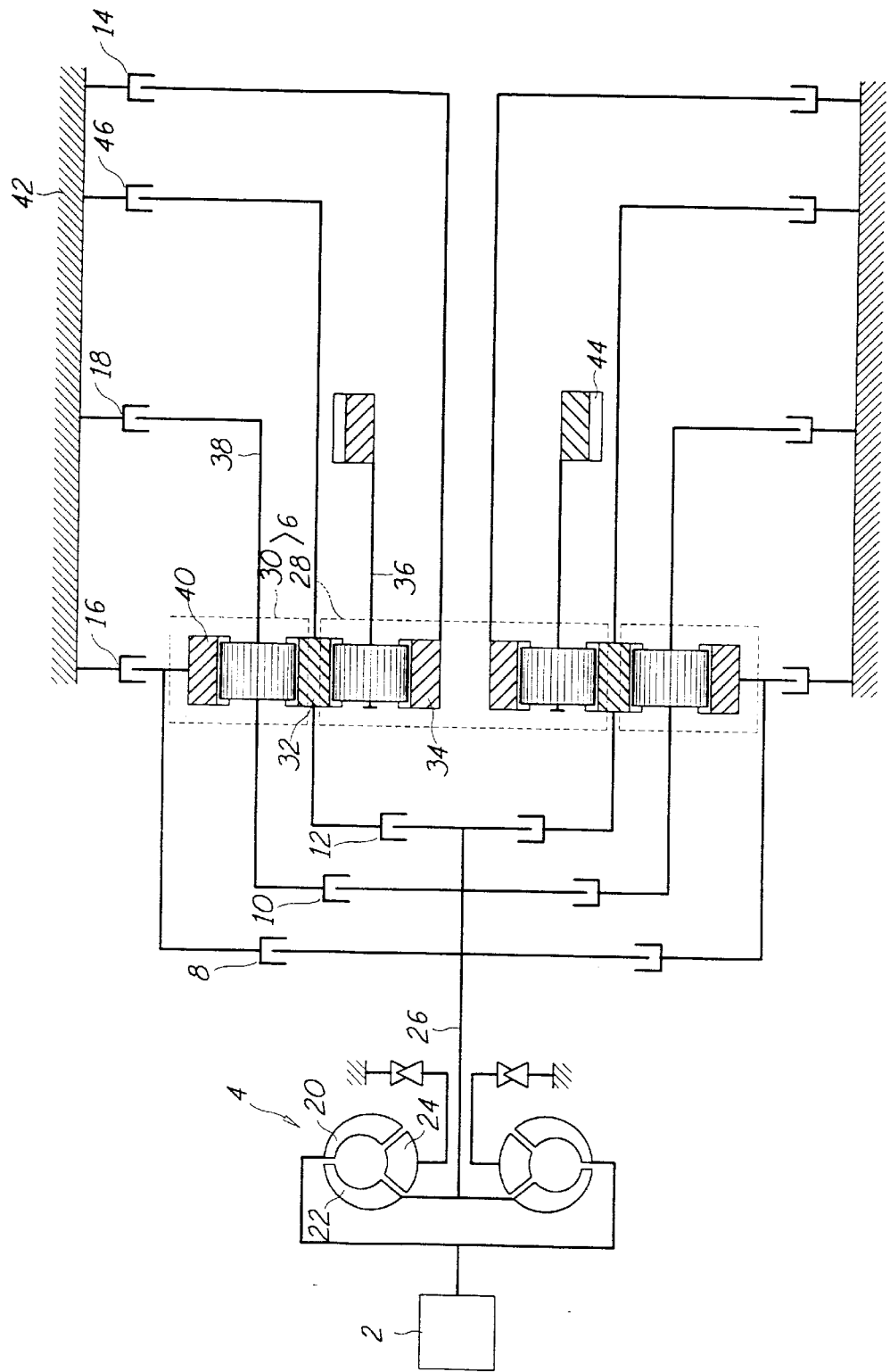
FIG. 7 is a schematic diagram of a gear train according to a fourth embodiment of the present invention.

Referring to FIG. 7, there is shown a schematic diagram of a gear train according to a fourth embodiment of the present invention. Clutches forming the clutch assembly are differently connected to brakes forming the brake assembly than in the third embodiment.

Namely, the first clutch 72 of the clutch assembly for transmitting the power of the engine 2 to the compound planetary gear set 6, is interposed between the input shaft 26 and the second ring gear 40, the second clutch 74 is interposed between the input shaft 26 and the second planetary carrier 38, and the third clutch 76 is interposed between the input shaft 26 and the first ring gear 32.

As a result, through the selective operation of the clutches 72, 74 and 76, one or two of the elements connected to the clutches are made to operate as input elements.

In addition, forming the brake assembly, the first brake 90 is interposed between the first sun gear 34 and the transmission housing 42, the second brake 92 is interposed between the second ring gear 40, the third brake 94 is interposed between the second planetary carrier 38, and the fourth brake 96 is interposed between the first ring gear 32 to allow the above elements to selectively operate as reaction elements, and the output gear 44 is disposed at an end portion of the first planetary carrier 36 to allow it to operate as an output element.

In the gear train of the fourth embodiment structured as in the above, the friction elements are operated, as shown in the operational chart of FIG. 9, to realize shifting. In the forward first speed, the first clutch 72 and the first brake 90 are controlled to be operated.

When this is done, the power of the input shaft 26 which rotates by the engine 2 makes the second ring gear 40 operate as an input element by the operation of the first clutch 72, and, at the same time, the first sun gear 34 to act as a reaction element by the operation of the first brake 90. Through the above operations, first speed shifting is realized, and through the first planetary carrier 36, output is realized.

If vehicle speed and throttle opening are increased in the above first speed state, the transmission control unit disengages the first clutch 72 and operates the second clutch 74.

When this is done, an input element is changed to the second planetary carrier 38 according to the operation of the second clutch 74, and second speed shifting is realized.

If vehicle speed and throttle opening are increased in the above second speed state, the transmission control unit disengages the second clutch 74 and operates the third clutch 76.

When this is done, an input element is changed to the first ring gear 32 according to the operation of the third clutch 76, and third speed shifting is realized.

In the above third speed state, if vehicle speed and throttle opening are increased, the transmission control unit disengages the first brake 90 and operates the first clutch 72.

When the above is done, reaction force is released in the third speed input state, and the second ring gear 40 operates as an input element, whereby second input is realized, and as there comes to be two input elements, fourth speed shifting is realized.

If vehicle speed and throttle opening are further increased in the above fourth speed state, the transmission control unit disengages the first clutch 72, operating in the fourth speed, and controls the second brake 92 to operate.

When the above is performed, input is realized through the first ring gear 32, and by the operation of the second brake 92, the second ring gear 40 operates as a reaction element to realize fifth speed shifting. In the above fifth speed, an overdrive state occurs wherein output speed is faster than input speed.

If vehicle speed and throttle opening are further increased in the above fifth speed state, the transmission control unit disengages the second brake 92, operating in the fifth speed, and controls the third brake 94 to operate.

When the above is performed, input is realized through the first ring gear 32, and by the operation of the third brake 94, the second planetary carrier 38 operates as a reaction element to realize sixth speed shifting.

If a driver changes a selector lever to a reverse R range, the transmission control unit controls the first clutch 72 and the fourth brake 96 to operate.

When the above happens, input is realized through the second ring gear 40 by the operation of the first clutch 72, and, at the same time, by the operation of the fourth brake 96, the first ring gear 32 comes to operate as a reaction element to realize reverse R shifting. Also, output is realized through the first planetary carrier 36.

In the above second to fourth embodiments, as in the first embodiment, multi-plate clutches are used for first to third clutches 8, 10, 12, 60, 62, 64, 66, 68, 70, 72, 74, and 76 forming the clutch assembly, and band brakes are used for the first to fourth brakes 14, 16, 18, 46, 78, 80, 82, 84, 86, 88, 90, 92, 94 and 96 forming the brake assembly.

In the gear train of the present invention structured as above, by utilizing a compound planetary gear set consisting of planetary gear sets combine radially, it is possible to design an automatic transmission having a short length and a simple construction.

Further, by increasing shift ranges through 6 forward drive ranges and 1 rearward range, output of the engine can be more efficiently used than in the prior art.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A gear train for a 6-speed automatic transmission used in a vehicle, comprising:

a compound planetary gear set, including a first and a second simple planetary gear set combined such that the planetary gear set is outside the first planetary gear set in a radial direction, the compound planetary gear set comprising a plurality of operational elements including a first sun gear, a first planetary carrier, a first ring gear that also acts as a second sun gear to the second simple planetary gear set, a second planetary carrier and a second ring gear;

a clutch assembly, mounted between at least three of the operational elements of the compound planetary gear set and an input shaft, and operating to select the operational elements to be input elements; and a brake assembly, mounted between at least three of the operational elements of the compound planetary gear set and a transmission housing, and operating to select the operational elements to be reaction elements.

2. The gear train of claim 1, wherein said clutch assembly includes:

a first clutch interposed between the first sun gear and the input shaft;

a second clutch interposed between the first ring gear and the input shaft; and a third clutch interposed between the second planetary carrier and the input shaft.

3. The gear train of claim 1, wherein said clutch assembly includes:

a first clutch interposed between the second ring gear and the input shaft;

a second clutch interposed between the first ring gear and the input shaft; and a third clutch interposed between the planetary carrier and the input shaft.

4. The gear train of claim 1, wherein said clutch assembly includes:

a first clutch interposed between the first sun gear and the input shaft;

a second clutch interposed between the first planetary carrier and the input shaft; and a third clutch interposed between the first ring gear and the input shaft.

5. The gear train of claim 1, wherein said clutch assembly includes:

a first clutch interposed between the second ring gear and the input shaft;

a second clutch interposed between the second planet carrier and the input shaft;

a third clutch interposed between the first ring gear and the input shaft.

6. The gear train of claim 1, wherein said brake assembly includes:

a first brake interposed between the first ring gear and the transmission housing;

a second brake interposed between the second planetary carrier and the transmission housing; and a third brake interposed between the second ring gear and the transmission housing.

7. The gear train of claim 1, wherein said brake assembly includes:

a first brake interposed between the first ring gear and the transmission housing;

a second brake interposed between the first planetary carrier and the transmission housing; and a third brake interposed between the first sun gear and the transmission housing.

8. The gear train of claim 1, wherein said brake assembly includes:

a first brake interposed between the second ring gear and the transmission housing;

a second brake interposed between the first sun gear and the transmission housing;

a third brake interposed between the first planetary carrier and the transmission housing; and a fourth brake interposed between the first ring gear and the transmission housing.

9. The gear train of claim 1, wherein said brake assembly includes:

a first brake interposed between the first sun gear and the transmission housing;

a second brake interposed between the first ring gear and the transmission housing;

a third brake interposed between the second planetary carrier and the transmission housing; and a fourth brake interposed between the first ring gear and the transmission housing.

10. The gear train of claim 1, wherein multi-plate clutches are used for clutches forming said clutch assembly, and band brakes are used for brakes forming said brake assembly.

11. The gear train of claim 1, wherein said clutch assembly comprises a plurality of clutches disposed between the input shaft, and the first sun gear, the first ring gear, and the second planetary carrier, respectively, such that they can selectively act as input elements; and said brake assembly comprises a plurality of brakes disposed between the transmission housing, and the first ring gear, the second planetary carrier and the second ring gear, respectively, such that they can selectively act as reaction elements.

12. The gear train of claim 1, wherein said clutch assembly comprises a plurality of clutches disposed between the input shaft, and the first planetary carrier, the first ring gear, and the second ring gear, respectively, such that they can selectively act as input elements; and said brake assembly comprises a plurality of brakes disposed between the transmission housing, and the first ring gear, the first planetary carrier and the first sun gear, respectively, such that they can selectively act as reaction elements.

13. The gear train of claim 1, wherein said clutch assembly comprises a plurality of clutches disposed between the input shaft, and the first sun gear, the first planetary carrier, and the first ring gear, respectively, such that they can selectively act as input elements; and said brake assembly comprises a plurality of brakes disposed between the transmission housing, and the first sun gear, the first planetary carrier, and the first ring gear, respectively, such that they can selectively act as reaction elements.

14. The gear train of claim 1, wherein said clutch assembly comprises a plurality of clutches disposed between the input shaft, and the first ring gear, the second planetary carrier, and the second ring gear, respectively, such that they can selectively act as input elements; and said brake assembly comprises a plurality of brakes disposed between the transmission housing, and the first sun gear and the first ring gear, and the second ring gear and the second planetary carrier, respectively, such that they can selectively act as reaction elements.

\* \* \* \* \*